United States Patent
Klose et al.

(10) Patent No.: US 9,028,235 B2
(45) Date of Patent: May 12, 2015

(54) METHOD AND APPARATUS FOR MOVING A TUBE EXTRUSION LINE ALONG

(75) Inventors: Reinhard Klose, Rintein (DE); Jörg Schmuhl, Koniga Wusterhausen (DE)

(73) Assignee: Inoex GmbH, Bad Oeynhausen (DE)

( * ) Notice: Subject to any disclaimer, the term of this patent is extended or adjusted under 35 U.S.C. 154(b) by 533 days.

(21) Appl. No.: 13/178,335

(22) Filed: Jul. 7, 2011

(65) Prior Publication Data
US 2012/0306111 A1    Dec. 6, 2012

(30) Foreign Application Priority Data
Jul. 9, 2010   (DE) .......................... 10 2010 026 731

(51) Int. Cl.
| | |
|---|---|
| B29C 47/78 | (2006.01) |
| B29C 47/90 | (2006.01) |
| B29C 47/00 | (2006.01) |
| B29C 47/08 | (2006.01) |
| B29C 47/34 | (2006.01) |
| B29L 23/00 | (2006.01) |

(52) U.S. Cl.
CPC ........... B29C 47/903 (2013.01); B29C 47/0023 (2013.01); B29C 47/0842 (2013.01); B29C 47/0872 (2013.01); B29C 47/34 (2013.01); B29C 47/902 (2013.01); B29C 47/904 (2013.01); B29C 47/907 (2013.01); B29C 2947/92485 (2013.01); B29C 2947/92514 (2013.01); B29C 2947/92923 (2013.01); B29C 2947/9298 (2013.01); B29L 2023/00 (2013.01)

(58) Field of Classification Search
CPC  B29C 47/009; B29C 47/0092; B29C 47/901; B29C 47/02; B29C 47/903

USPC ........................................... 264/209.3, 209.4
See application file for complete search history.

(56) References Cited

U.S. PATENT DOCUMENTS

| | | | | |
|---|---|---|---|---|
| 3,169,272 | A * | 2/1965 | Maxson | 425/377 |
| 6,368,547 | B1 * | 4/2002 | Visscher | 264/558 |
| 6,576,180 | B1 * | 6/2003 | Rahn | 264/508 |
| 2006/0053915 | A1 | 3/2006 | Horwath | |

FOREIGN PATENT DOCUMENTS

| | | |
|---|---|---|
| DE | 1 094 977 | 12/1960 |
| DE | 1 156 972 | 11/1963 |

(Continued)

*Primary Examiner* — Galen Hauth
(74) *Attorney, Agent, or Firm* — Jennifer S. Stachniak; Robert W. Becker (57) ABSTRACT

A method and apparatus for moving along a tube extrusion line. An extruded tube is pushed through the extrusion line, by means of pressure generated by an extruder, to a withdrawal unit that takes over further driving of the tube. In a first-moving along phase, in which the tube has not yet passed a sealing of a calibration cooling unit relative to the atmosphere, the latter is under atmospheric pressure. In a second phase, in which the tube has passed the sealing, the calibration and cooling unit is placed under underpressure. In the first phase, the tube is supported either by internal overpressure or by a mechanical inner guide. A support cylinder extends axially from a casing head of the extruder and extends coaxially into a calibration sleeve in a first section of the calibration and cooling unit. A support plate is disposed between the casing head and an inlet of the calibration sleeve and provides external support for a tube exiting the casing head.

4 Claims, 6 Drawing Sheets

(56) References Cited

FOREIGN PATENT DOCUMENTS

| DE | 40 33 441 | 5/1991 |
| DE | 102 58 813 | 7/2004 |
| DE | 202004019566 | 8/2005 |
| DE | 202 21 671 | 12/2006 |
| DE | 102005028085 | 12/2006 |

* cited by examiner

METHOD AND APPARATUS FOR MOVING A TUBE EXTRUSION LINE ALONG

BACKGROUND OF THE INVENTION

The instant application should be granted the priority dates of Jul. 9, 2010, the filing date of the corresponding German patent application 10 2010 026 731.7.

The present invention relates to a method and an apparatus for moving along a tube extrusion line having an extruder, a calibration and cooling unit, and a withdrawal unit.

Tube extrusion lines are provided with an extruder having a die, a so-called casing head, a calibration and cooling unit and possibly further cooling tanks, as well as a withdrawal unit. During normal operation, the extruded tube is pulled through the extrusion line at the required velocity by the withdrawal unit, which is generally embodied as a caterpillar-type withdrawal mechanism.

During the moving along, there is generally no tube in the extrusion line. A starting or dummy tube must therefore be used. A dummy tube must be "threaded through" all of the devices from the rear end of the extrusion line until its front end extends out of the calibration and cooling unit. It can then be connected, for example by fusing or heat sealing, with the molten tube exiting the casing head. After the production of this connection, a pulling force is applied to the dummy tube by the withdrawal unit, so that ultimately the newly produced tube, which is connected to the dummy tube, enters the withdrawal unit. The task of the dummy tube is therewith finished.

This method of proceeding known from the state of the art has a number of drawbacks. For example, the dummy tube must as closely as possible have the same diameter as does the tube that is to be produced, so that the final seal of the calibration and cooling unit, which is sealed relative to the atmosphere, rests against the dummy tube and immediately an underpressure can be employed in the calibration and cooling unit. Otherwise, the number of rejects of newly produced tubes would increase. In addition, the produced tube and the dummy tube should as much as possible be made of the same material in order to be able to optimally produce the fused connection. A further drawback during the moving along of an extrusion line using a dummy tube is that the dummy tube must be "threaded" from the rear through the entire length of the extrusion line. In so doing, components of the unit can be damaged. Furthermore, this "threading process", where the metric weight of the dummy tube is great, is, in the truest sense of the word, very difficult.

The aforementioned drawbacks are avoided with a moving along system that is disclosed in DE 202 21 671 U1. With this system, a so-called coupling head is utilized. For the moving along of the extrusion line, this head projects out of the calibration and cooling unit in the direction of the casing head. The coupling head has a cylindrical projection with which the molten tube exiting the casing head can be connected, for example by fusing or clamping. The coupling head is connected to a pulling mechanism. This pulling mechanism is provided, for example, with a cable that is guided from the coupling head through the entire extrusion line, and is connected at the rear end with a winch. After the connection of the molten tube exiting the casing head with the coupling head, a pulling force is applied to the coupling head, and hence to the produced tube, by means of the pulling mechanism. As soon as the coupling head has passed the withdrawal unit, the latter takes over the further withdrawal of the produced tube in the tube extrusion line.

During the moving along, an overpressure is produced by the supply of compressed air in the interior of the molten tube between the casing head and the coupling head. Since atmospheric pressure still exists in the calibration and cooling unit, the molten tube is pressed against a calibration device, for example a calibration sleeve, due to a pressure differential. As a result, the produced tube obtains the desired outer diameter already at the beginning, so that rejects during the moving along can be reduced. After the coupling head has passed a seal disposed at the outlet of the calibration and cooling unit, this seal automatically or in a positively controlled manner rests sealingly against the produced tube, so that a vacuum is generated in the calibration and cooling unit, and the supply of compressed air into the interior of the molten tube can be shut off. Since now furthermore there is a pressure differential between the interior of the tube and the calibration and cooling unit, the calibration of the tube can be continued in an uninterrupted manner.

A drawback of the technology described in DE 202 21 671 U1 is that a connection between the molten tube exiting the casing head and the coupling head must furthermore be established. In addition, care bust be taken that the pulling cable extend fairly centrally through the extrusion line in order to prevent tilting or twisting of the coupling head.

DE 10 2005 028 085 A1 describes an apparatus for the connection of two tube ends. With this moving along technology, again a dummy tube is utilized, although in one embodiment this dummy tube is not connected directly with the molten tube, but rather via a counter piece about which the molten tube is disposed. The counter piece is connected via a traction eye and a cable with an engagement mandrel, which can be fixed in position in the dummy tube via expansion means.

It is an object of the present invention to provide a method and an apparatus for the moving along of a tube extrusion line that operate entirely without traction means and hence avoid the drawbacks thereof.

SUMMARY OF THE INVENTION

This object is inventively realized by a method that comprises pushing an extruded tube through the extrusion line, by means of extrusion pressure generated by the extruder, to the withdrawal unit, which takes over driving of the tube; in a first moving-along phase in which the tube has not yet passed a sealing of the calibration and cooling unit relative to the atmosphere, placing the calibration and cooling unit under atmospheric pressure; in a second moving-along phase, in which the tube has passed such sealing, placing the calibration and cooling unit under underpressure; and in the first phase, supporting the tube either by internal overpressure or by mechanical inner guide or support mechanism. The apparatus for carrying out this method comprises a calibration and cooling unit having at least two sections, each of which is provided with a seal: a calibration sleeve disposed in a first one of these sections as viewed in a direction of extrusion: a support cylinder configured to extend axially from a casing head of the extruder and to extend coaxially into the calibration sleeve; and a support plate disposed between the casing head and an inlet on the calibration sleeve, wherein the support plate is configured to provide external support for a tube exiting the casing head.

With the method of the present invention, the extruded tube is no longer pulled through the extrusion line, but rather is pushed through, and in particular entirely utilizing just the extrusion pressure generated by the extruder. When the tube that is thus pressed or driven through the extrusion line reaches the withdrawal unit, the latter takes over the further drive of the extruded tube, as is customary in the normal operation of an extrusion line. Since in a first moving-along phase the calibration and cooling unit is still under atmospheric pressure, since the pressed ahead or advanced tube does not yet rest against a seal that seals the calibration and cooling unit relative to the atmosphere by abutment against the extruded tube, care must be taken that the not yet rigid tube is supported from within in the calibration and cooling unit so that it does not collapse. This is achieved in that either an overpressure is produced in the tube relative to the inner space of the calibration and cooling unit, for example by the supply of compressed air, or in that the tube is bodily supported by a mechanical internal guidance or support mechanism. As soon as the produced tube has passed the seal, an underpressure is generated in the calibration and cooling unit, so that the tube can be calibrated to the desired outer diameter. The supply of compressed air is stopped during the first type of support.

Pursuant to further advantageous specific embodiments of the invention, the sections of the calibration and cooling unit can be moved so as to be against and/or spaced from one another. In addition, the support cylinder can be introduceable into the casing head. Pursuant to yet another embodiment, the support plate can be comprised of radially displaceable segments.

BRIEF DESCRIPTION OF THE DRAWINGS

The invention will be explained in greater detail subsequently with the aid of exemplary embodiments shown in the pertaining drawings, in which:

FIG. 1 an extrusion line for the production of polymeric tubes, wherein the main components are illustrated schematically, FIG. 2 a schematic cross-section through a first exemplary embodiment of a calibration and cooling unit for carrying out an inventive moving along process at the beginning of the passage of a tube through the calibration and cooling unit, FIG. 3 an illustration pursuant to FIG. 2 in a middle stage of the passage of a tube through the calibration and cooling unit, FIG. 4 an illustration pursuant to FIG. 2 after a tube has passed through the calibration and cooling unit, FIG. 5 a schematic cross-section through a second exemplary embodiment through a calibration and cooling unit for carrying out an inventive moving along process prior to entry of a tube into the calibration and cooling unit, and FIG. 6 an illustration pursuant to FIG. 5 after entry of the tube into the calibration and cooling unit.

DESCRIPTION OF PREFERRED EMBODIMENTS

Figure 1:
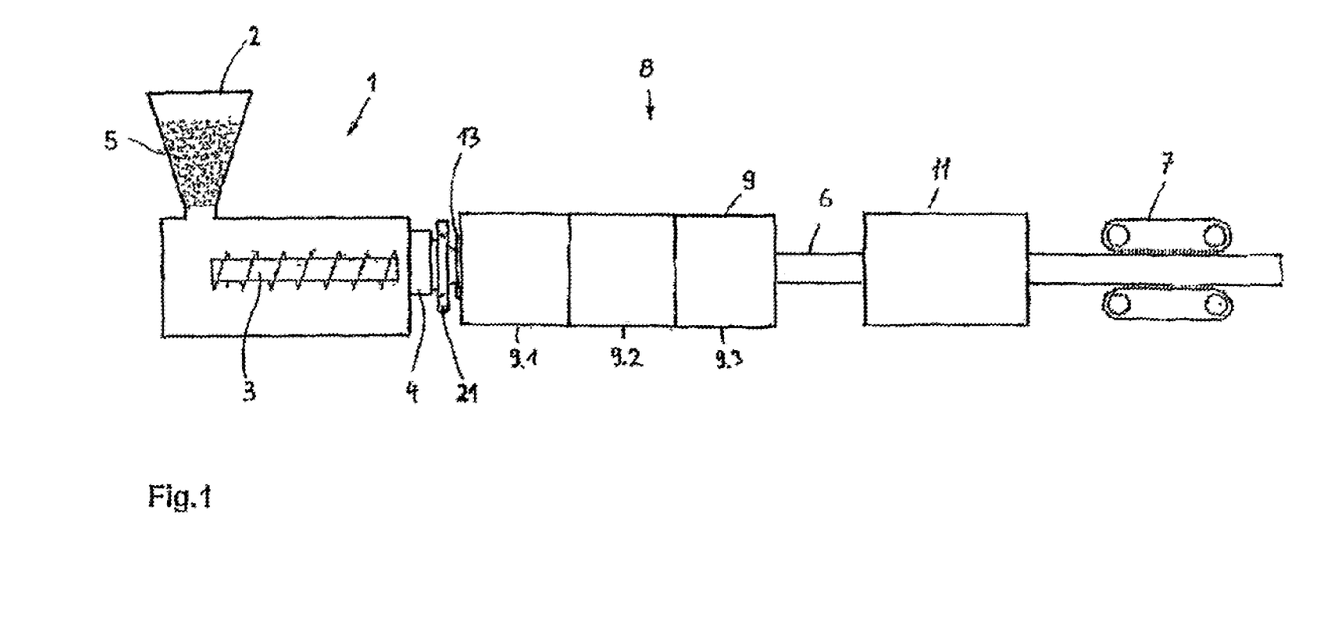

The extrusion line illustrated in FIG. 1 includes an extruder 1 having a feed hopper 2, an extruder screw or screw conveyor 3 and a casing, tube or extrusion head 4. By means of the feed hopper 2, a thermoplastic polymeric material 5 is supplied to the extruder 1 in granular or pulverous form. The granulate or powder is heated, kneaded and plasticized in the extruder 1. Subsequently, the polymeric material, as a moldable mass, is conveyed by means of the extruder screw into the casing head 4, where it is pressed through an annular passage gap or orifice.

After exiting the casing head 4, the hot and still deformable or plastic tube (molten tube) 6 is drawn through a calibration and cooling unit 8 by means of a withdrawal unit 7 that is disposed at the end of the extrusion line; the calibration and cooling unit is provided with a vacuum tank 9 having a perforated calibration sleeve 10 disposed at its inlet. The diameter of the calibration sleeve 10 is infinitely adjustable, so that the extruded and still plastic tube 6 can be fixed to the desired value. After leaving the calibration and cooling unit 8, the tube 6 enters one or also a plurality of cooling tanks 11 in which it is cooled to approximately room temperature.

Figure 2:
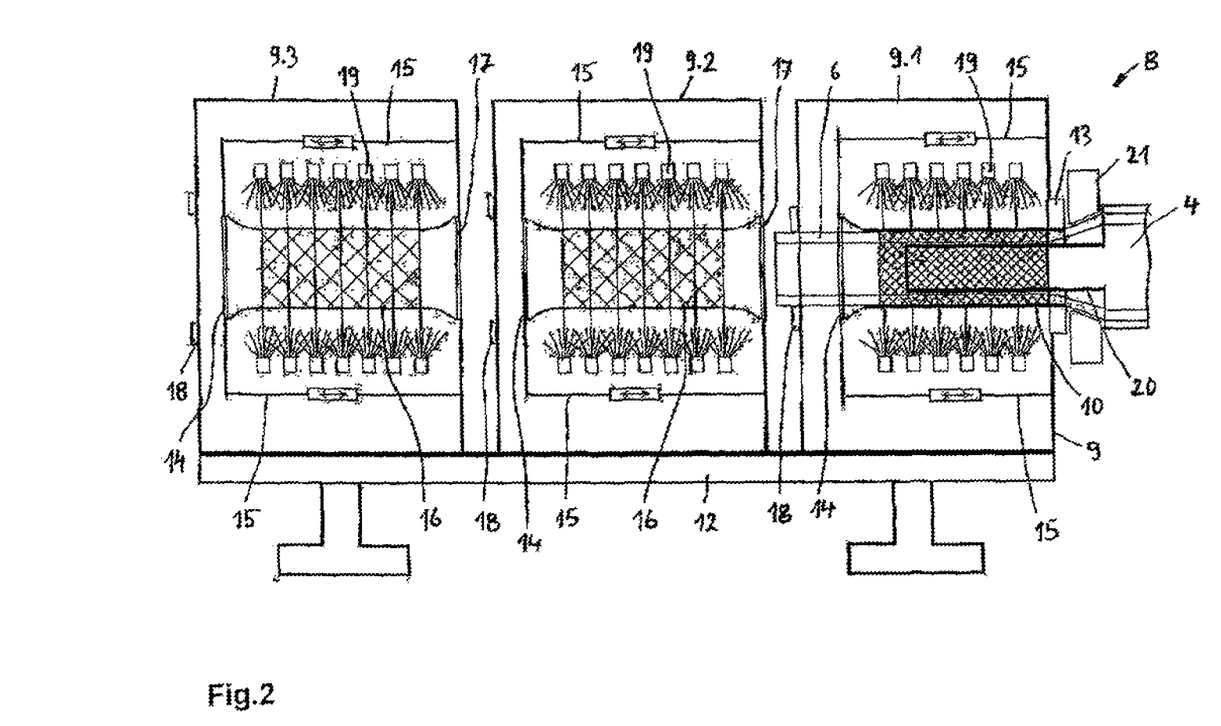
Figure 3:
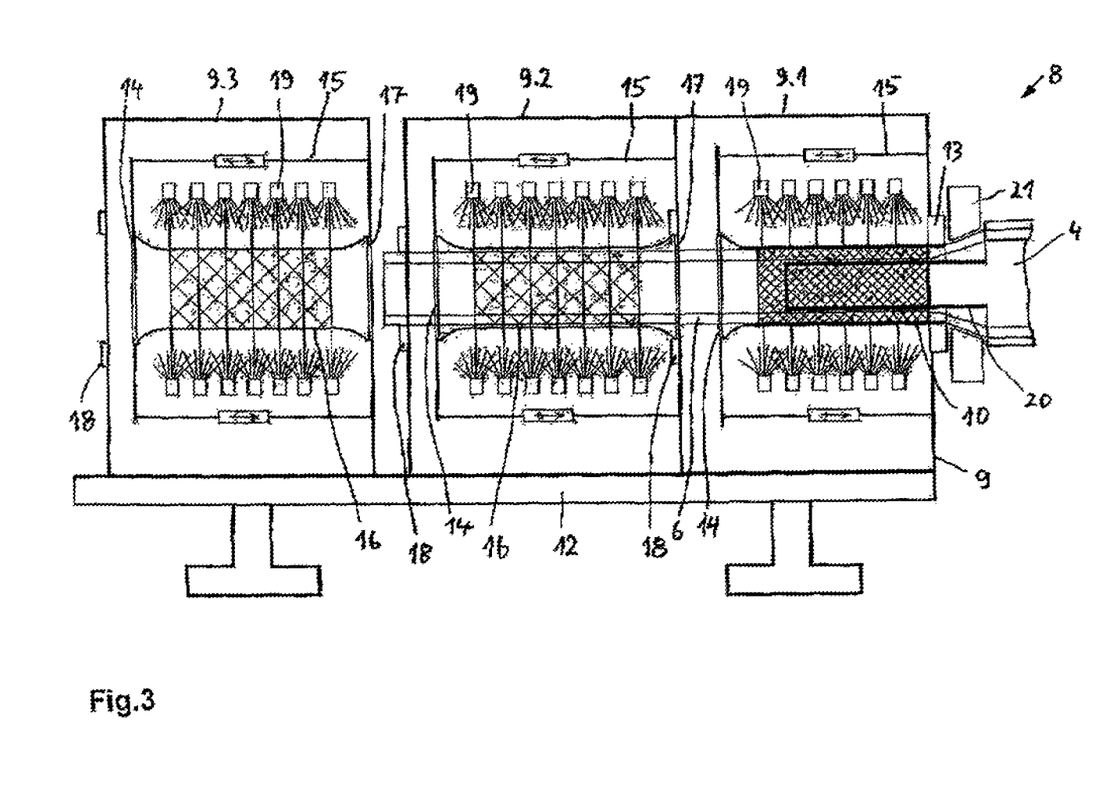
Figure 4:
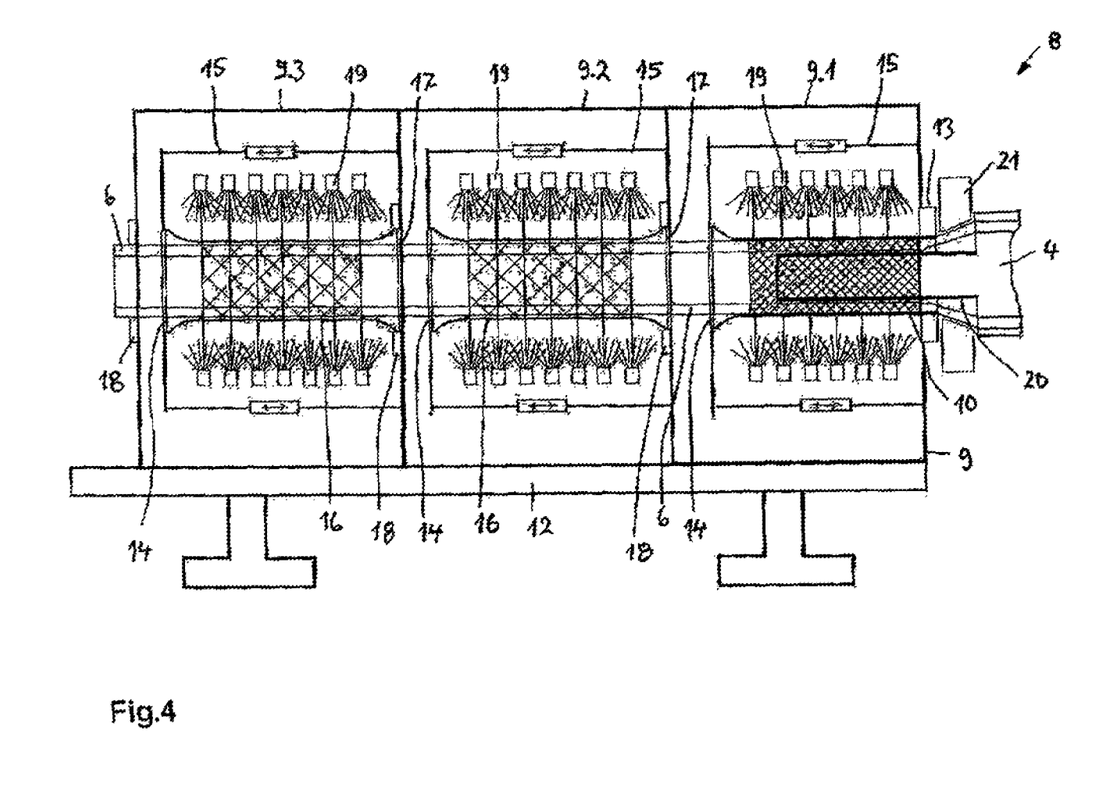

The calibration and cooling unit 8, a first exemplary embodiment of which is illustrated in FIGS. 2 to 4, has a vacuum tank 9 that is composed of three sections 9.1, 9.2 and 9.3. These sections 9.1, 9.2 and 9.3 are displaceable relative to one another on a bed 12 of the calibration and cooling unit 8, so that they can be spaced from one another, as illustrated in FIG. 2.

The calibration sleeve 10 is disposed in the first section 9.1 of the calibration and cooling unit 8. It has an annular inlet head 13 and an annular outlet head 14. While the inlet head 13 is disposed externally of the section 9.1, the outlet head 14 opens into the section 9.1. The outlet head 14 is displaceable relative to the stationary inlet head 13 in the axial direction of the calibration sleeve 10. For this purpose, two spindle units 15 are provided, with the aid of which the outlet head 14 can be displaced either toward or away from the inlet head 13, as a result of which the diameter of the calibration sleeve 10 is increased or reduced. To avoid repetition, for the further construction of the calibration sleeve 10 reference is made to DE 10 2005 002 820 B3, in which the calibration sleeve 10 and its function are described in detail.

Provided in the sections 9.2, 9.3 of the vacuum tank 9 are support mechanisms 16 for the extruded tube 6; the construction of the support mechanisms corresponds essentially to that of the calibration sleeve 10. An important difference to the calibration sleeve 10 is that the inlet heads 17 as well as the outlet heads 14 have a fixed diameter. For the further construction of the support mechanisms 16, reference is made to DE 103 180 037 B3 in which the support mechanisms 16 are described in detail.

Disposed at the outlet of each of the sections 9.1, 9.2 and 9.3 is a seal 18 through which the produced tube 6 passes. The seals 18 can be set or adjusted to the outer diameter of the produced tube 6. When the seals 18 rest against the outer periphery of the produced tubes 6, they seal the sections 9.1, 9.2 and 9.3 relative to the atmosphere.

Further components of the sections 9.1, 9.2 and 9.3 includes spray nozzles 19, by means of which for cooling purposes water is sprayed onto the surface of the tube. To the extent that explanatory details are required for the construction and function of the spray nozzles 19, reference is made to DE 10 2008 037 874 A1, which for the purpose of further description of the spray nozzles 19 is made the subject matter of the exemplary embodiment.

Extending axially from the casing head 4 is a support cylinder 20, which extends through the inlet head 13 and coaxially into the calibration sleeve 10. Disposed concentrically relative to the support cylinder 20 is a support plate 21, which is comprised of radially adjustable segments and essentially fills the space between the casing head 4 and the inlet head 13.

The moving-along process of a tube extrusion line will be described subsequently with the aid of FIGS. 2 to 4.

After leaving the casing head 4, the hot and still plastic tube 6, which is guided externally by the support plate 21, is pressed into the inlet head 13 of the calibration sleeve 10 by the extrusion pressure that is built up by the extruder 1; in the inlet head, the tube 6 rests against the outer surface of the support cylinder 20. For a good sliding friction, the support cylinder 20 is provided with a PTFE coating. The tube 6 is now pushed further onto the support cylinder 20 through the calibration sleeve 20. The inner diameter of the calibration sleeve is set such that there is a slight gap relative to the surface of the tube. As the tube 6 passes through the vacuum tank 9, it is constantly cooled by the spray nozzles 19 in all of the sections 9.1, 9.2 and 9.3.

A soon as the tube 6 emerges from the section 9.1, the seal 18 of the latter is delivered radially onto the tube 6, so that the seal 18 rests sealingly against the periphery of the tube 6. At the same time, an underpressure is generated in the section 9.1, so that due to the pressure differential between the interior of the tube and the interior of the section 9.1, the tube 6 is pressed against the inner surface of the calibration sleeve 10.

After the closing or contacting of the seal 18 of the section 9.1, the section 9.2 is moved to the section 9.1. The tube 6 now passes through the section 9.2, and when it leaves this section 9.2 is sealingly surrounded by the seal 18. Underpressure is now also established in the section 9.2, and the section 9.3 is moved to the section 9.2. The tube 6 now passes through the section 9.3 which, after emergence of the tube 6 and contacting of the seal 18, is also placed under an underpressure.

After leaving the calibration and cooling unit 8, the tube 6 is pushed through the following devices of the extrusion line until it has reached the withdrawal unit 7, which then takes over the further drive of the tube 6.

In the previous exemplary embodiment, the support cylinder 20 was described as a stationary device. However, it can also advantageously be embodied in such a way that it can be introduced into the casing head 4, since after the moving along, it has no further function.

Figure 5:
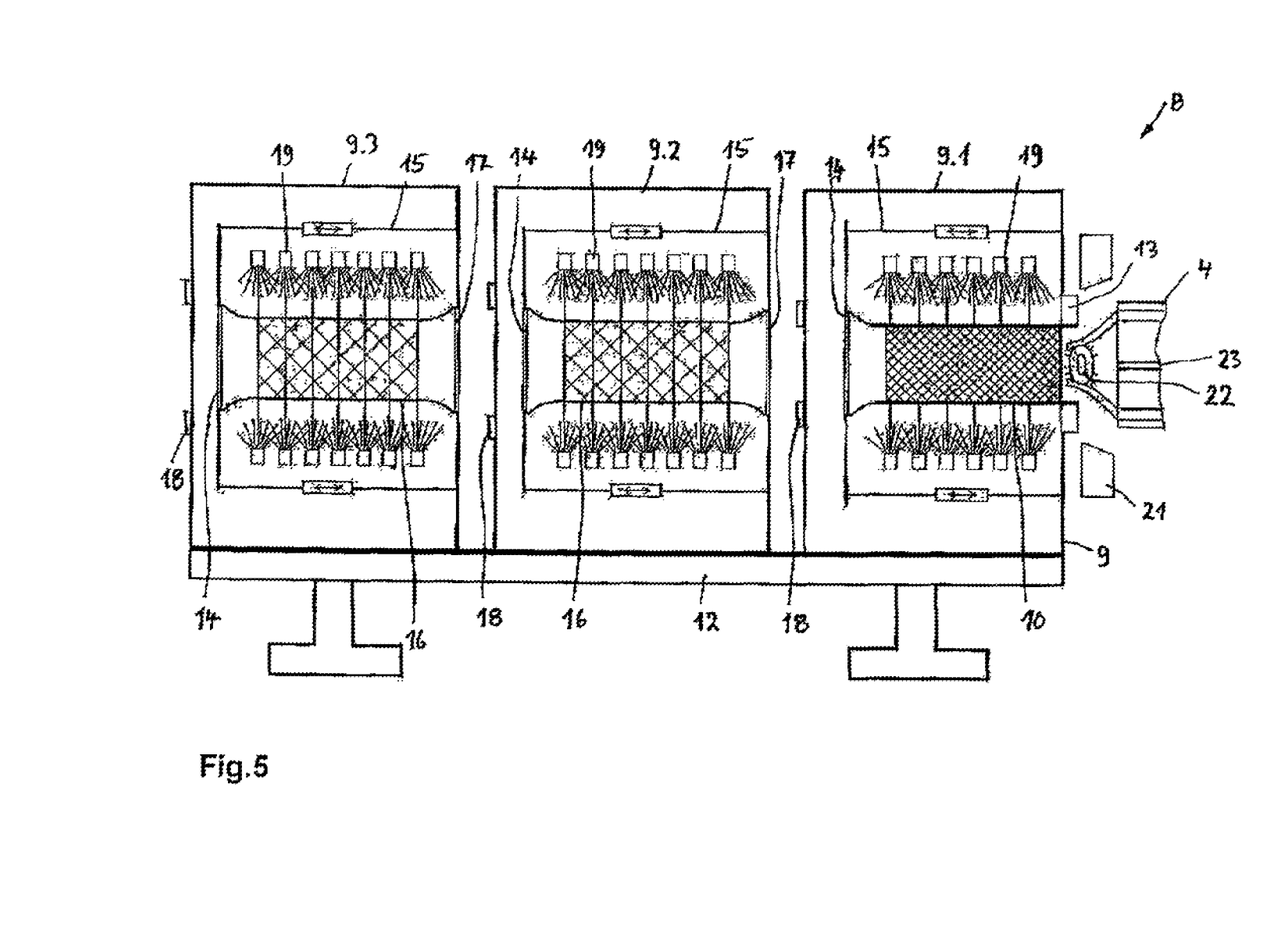
Figure 6:
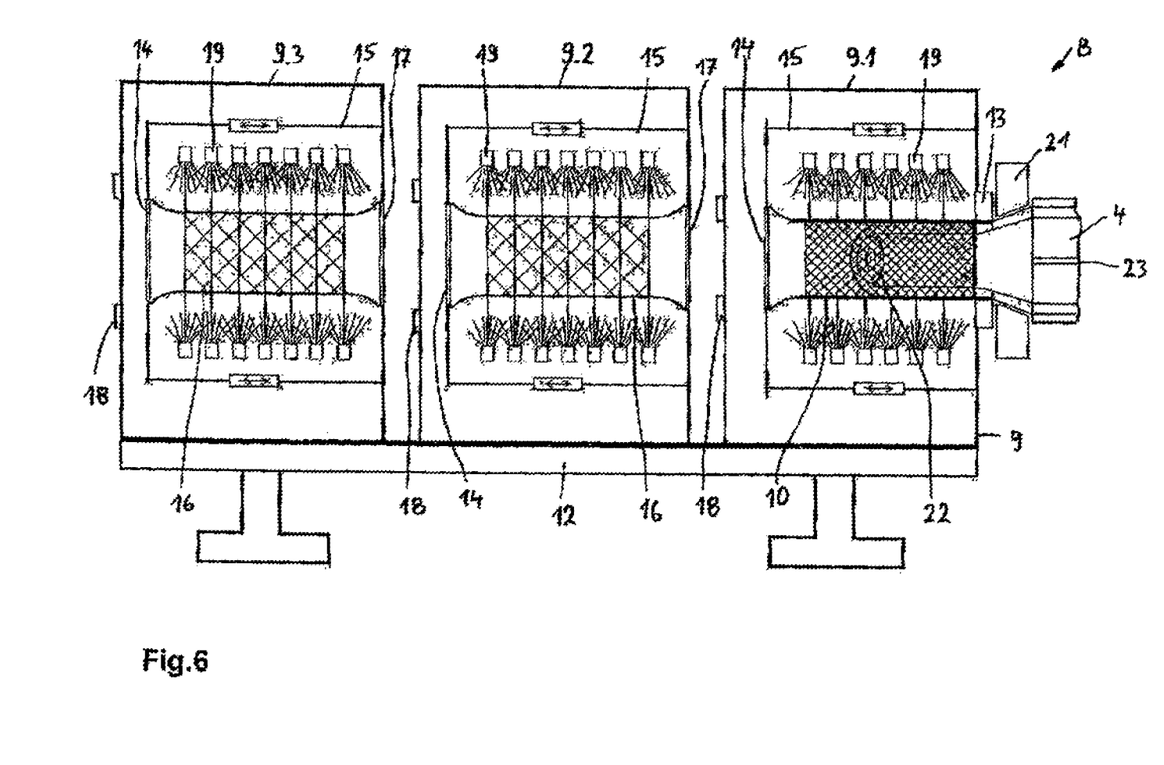

A further exemplary embodiment of the present invention is described in FIGS. 5 and 6. The construction and the function of the calibration and cooling unit 8 of this embodiment correspond to those of the previous embodiment.

In this embodiment, as the extruded tube 6 passes through the first section 9.1 of the vacuum tank 9, it is not supported by a support cylinder, but rather by an internal pressure. For this purpose, with the support plate 21 extended, a closure element 22 is placed into the hot, still plastic tube 6 exiting the casing head 4; the tube 6 sealingly cakes onto or sticks against the closure element. This situation is illustrated in FIG. 5. The beginning of the tube is now introduced along with the inserted closure element 22 into the calibration sleeve 10. At the same time, compressed air is introduced into the interior of the tube via a compressed air line 23 that is guided through the casing head 4, and the support plate 21 is retracted for outer support of the tube 6, as illustrated in FIG. 6. Due to the overpressure in the interior of the tube, the latter rests against the inner surface of the calibration sleeve 10 and is pushed through the section 9.1 by the extrusion pressure. After passing through the section 9.1, the seal 18 of the latter approaches, i.e. is closed. At the same time, underpressure is generated in the section 9.1, and the supply of compressed air through the line 23 is shut off. Due to the still existing pressure differential, the tube 6 remains in contact against the calibration sleeve 10, i.e. the tube 6 is calibrated.

The tube 6 subsequently passes through the two further sections 9.2 and 9.3 of the vacuum tank, as described in conjunction with the previous embodiment.

In both of the previously described embodiments, the sections 9.1, 9.2 and 9.3 of the vacuum tank 9 can be moved relative to one another, so that they can be spaced from one another. This solution has the advantage that as a result inspection spaces can be provided by means of which the produced tube 6 can be observed as it passes through the vacuum tank 9.

Such a movability of the sections 9.1, 9.2 and 9.3 is not necessary for the present invention. It is sufficient if the vacuum tank 9 is partitioned into three sections, whereby a seal 18 is associated at the outlet of each section. The specification incorporates by reference the disclosure of German 10 2010 026 731.7 filed Jul. 9, 2010.

The present invention is, of course, in no way restricted to the specific disclosure of the specification and drawings, but also encompasses any modifications within the scope of the appended claims.

The invention claimed is:

1. An extrusion line, comprising:
a calibration and cooling unit (8) having at least two sections (9.1, 9.2, 9.3), each of which is provided with a seal (18);
a calibration sleeve (10) disposed in a first one (9.1) of said sections of said calibration and cooling unit (8) as viewed in a direction of extrusion;
an extruder (1) having a casing head (4);
a support cylinder (20) configured to extend axially from said casing head (4) and to extend coaxially into said calibration sleeve (10); and
a support plate (21) disposed between said casing head (4) and an inlet (13) of said calibration sleeve (10), wherein said support plate (21) is configured to provide external support for a tube (6) exiting said casing head (4).

2. An extrusion line according to claim 1, wherein said sections (9.1, 9.2, 9.3) of said calibration and cooling unit (8) are movable so as to be against and/or spaced from one another.

3. An extrusion line according to claim 1, wherein said support cylinder (20) is further configured to be introduceable into said casing head (4).

4. An extrusion line according to claim 1, wherein said support plate (21) is comprised of radially displaceable segments.

* * * * *